(12) United States Patent
Kitano

(10) Patent No.: US 11,812,537 B2
(45) Date of Patent: Nov. 7, 2023

(54) INDUCTION HEATED ROLL APPARATUS

(71) Applicant: TOKUDEN CO., LTD., Kyoto (JP)

(72) Inventor: Takatsugu Kitano, Otsu (JP)

(73) Assignee: TOKUDEN CO., LTD., Kyoto (JP)

( * ) Notice: Subject to any disclaimer, the term of this patent is extended or adjusted under 35 U.S.C. 154(b) by 59 days.

(21) Appl. No.: 17/646,913

(22) Filed: Jan. 4, 2022

(65) Prior Publication Data

US 2022/0232674 A1 Jul. 21, 2022
US 2023/0247735 A9 Aug. 3, 2023

(30) Foreign Application Priority Data

Jan. 21, 2021 (JP) .................................. 2021-007789

(51) Int. Cl.
*H05B 6/14* (2006.01)
*F16C 13/02* (2006.01)
(52) U.S. Cl.
CPC ............. *H05B 6/145* (2013.01); *F16C 13/02* (2013.01); *F16C 2362/00* (2013.01)
(58) Field of Classification Search
CPC ..................................................... H05B 6/145
See application file for complete search history.

(56) References Cited

U.S. PATENT DOCUMENTS

| 6,437,301 | B1 * | 8/2002 | Kitano | .................... | F16C 21/00 |
| | | | | | 219/652 |
| 2006/0289483 | A1 * | 12/2006 | Kitano | .................. | F16C 27/066 |
| | | | | | 219/619 |
| 2019/0150231 | A1 * | 5/2019 | Kitano | ................... | H05B 6/145 |
| | | | | | 219/619 |

FOREIGN PATENT DOCUMENTS

JP          2005243402 A          9/2005

\* cited by examiner

*Primary Examiner* — Sarang Afzali
(74) *Attorney, Agent, or Firm* — Alleman Hall Creasman & Tuttle LLP

(57) ABSTRACT

In order to supply sufficient electric power to an induction heating mechanism even with a small-diameter roller, an induction heated roll apparatus includes a roller body having a hollow cylindrical shape, a drive shaft provided at each of both ends of the roller body and rotatably supported, an induction heating mechanism that is provided inside the roller body and allows the roller body to inductively generate heat, and a support shaft that extends from both ends of the induction heating mechanism and supports the induction heating mechanism. The support shaft is rotatably supported on an inner peripheral surface at both ends of the roller body via a bearing.

7 Claims, 5 Drawing Sheets

INDUCTION HEATED ROLL APPARATUS

BACKGROUND

Technical Field

The present disclosure relates to an induction heated roll apparatus.

Related Art

As disclosed in JP2005-243402A, a conventional induction heated roll apparatus includes a cylindrical roller body and an alternating magnetic flux generation mechanism (induction heating mechanism) that is provided inside the roller body and allows the roller body to inductively generate heat. A journal having a drive shaft is fixed to each of both ends of the roller body, and the drive shaft is rotatably supported with respect to a machine base via a bearing. The alternating magnetic flux generation mechanism (induction heating mechanism) is supported by a support rod, and the support rod extends inside the drive shaft and is rotatably supported by the drive shaft via a bearing. Further, a lead wire (leader line) connected to an induction coil of the induction heating mechanism is led out to outside through the support rod and connected to an AC power supply.

In the induction heated roll apparatus, a roller body having a small diameter may be selected in accordance with a heat treatment step or a heat-treated object. In this case, since a diameter of the drive shaft fixed to the roller body is reduced, a diameter of the support rod extending inside the drive shaft is also reduced. As a result, the leader line passing through the support rod is thin, a desired electric power cannot be supplied to the induction heating mechanism, and a heating temperature of the roller body is restricted.

PRIOR ART DOCUMENT

Patent Document

Patent Document: JP2005-243402A

SUMMARY

The present disclosure has been made to solve the above problems, and a main object of the present disclosure is to supply sufficient electric power to an induction heating mechanism with a small-diameter roller.

That is, an induction heated roll apparatus of the present disclosure includes a roller body having a hollow cylindrical shape, a drive shaft provided at each of both ends of the roller body and rotatably supported, an induction heating mechanism that is provided inside the roller body and allows the roller body to inductively generate heat, and a support shaft that extends from both ends of the induction heating mechanism and supports the induction heating mechanism, in which the support shaft is rotatably supported on an inner peripheral surface at the both ends of the roller body via a bearing.

In such a configuration, since the support shaft supporting the induction heating mechanism is supported on the inner peripheral surface at both ends of the roller body via the bearing, a diameter of the support shaft in the drive shaft can be increased as compared with a configuration in which the support shaft is supported on an inner peripheral surface of the drive shaft via the bearing. Thus, when the roller body has a small diameter, a lead wire led out to outside through inside of the support shaft can still be thickened, and sufficient power can be supplied to the induction heating mechanism. As a result, this can prevent restriction to a heating temperature of the roller body having a small diameter.

With the roller body having a small diameter and a long length, there is a problem that the induction heating mechanism and the support shaft provided inside the roller body also become long, and deflection of the induction heating mechanism and the support shaft becomes large. As a result, when the roller body has a small diameter and a long length, there is a high risk of contact between the roller body and the induction heating mechanism due to deflection at a center in an axial direction of the induction heating mechanism.

On the other hand, according to the present disclosure, the support shaft supporting the induction heating mechanism is supported on the inner peripheral surface at both ends of the roller body via the bearings. Thus, a distance between the bearings can be reduced as compared with the configuration in which the support shaft is supported via the bearings inside the drive shaft, and deflection of the induction heating mechanism and the support shaft can be reduced. As a result, the risk of contact between the roller body and the induction heating mechanism can be reduced.

As a specific embodiment of the support shaft, it is conceivable that the support shaft is an integral part penetrating the induction heating mechanism.

This configuration can improve a mechanical strength in a state where the induction heating mechanism is supported.

As a specific embodiment of the support shaft, it is conceivable that the support shaft includes a bearing fixing part supported by the bearing inside the roller body, and a lead wire extraction part that extends from an end of the bearing fixing part, is disposed inside the drive shaft, and through the lead wire extraction part a lead wire connected to the induction heating mechanism is inserted.

In this configuration, in order to further reduce the deflection of the support shaft supporting the induction heating mechanism, the bearing fixing part desirably has a larger diameter than the lead wire extraction part.

It is conceivable that the induction heating mechanism includes a cylindrical iron core having a cylindrical shape, and an induction coil wound around an outer peripheral surface of the cylindrical iron core. In this configuration, in order to efficiently pass a generated magnetic flux between the cylindrical iron core and the roller body, a part or all of the support shaft desirably includes a nonmagnetic material. The support shaft is less likely to inductively generate heat, and thermal deformation of the support shaft can be reduced.

In order to prevent the bearing from being damaged by induction heat generation due to the magnetic flux generated by the induction heating mechanism, a magnetic shield member including a magnetic material is desirably provided between the induction heat generation mechanism and the bearing on the support shaft.

Dimensions of the support shaft and the roller body are set in accordance with, for example, a heat treatment step and a heat-treated object. When a bearing is prepared in accordance with such a support shaft or roller body, the bearing is to be a dedicated product, which causes an increase in cost.

In order to suitably solve this problem, it is desirable that a spacer member be provided between the support shaft and the bearing or between the roller body and the bearing.

In this configuration, when a general-purpose bearing is used, a gap between the bearing and the support shaft or the roller body can be filled with the spacer member.

In order to facilitate replacement of a bearing as a consumable, it is desirable that the spacer member be provided with an attachment and detachment assist mechanism and is configured to be attachable and detachable together with the bearing.

The disclosed embodiments configured as described above can supply sufficient electric power to the induction heating mechanism even with a small-diameter roller.

DETAILED DESCRIPTION

Embodiment of Invention

Hereinafter, an embodiment of an induction heated roll apparatus 100 of the present disclosure will be described with reference to the drawings.

The induction heated roll apparatus 100 is used, for example, in a heat treatment step of a sheet material such as a plastic film, paper, cloth, nonwoven fabric, synthetic fiber, or metal foil, or a continuous material such as a web material or a wire (yarn) material.

Figure 1:
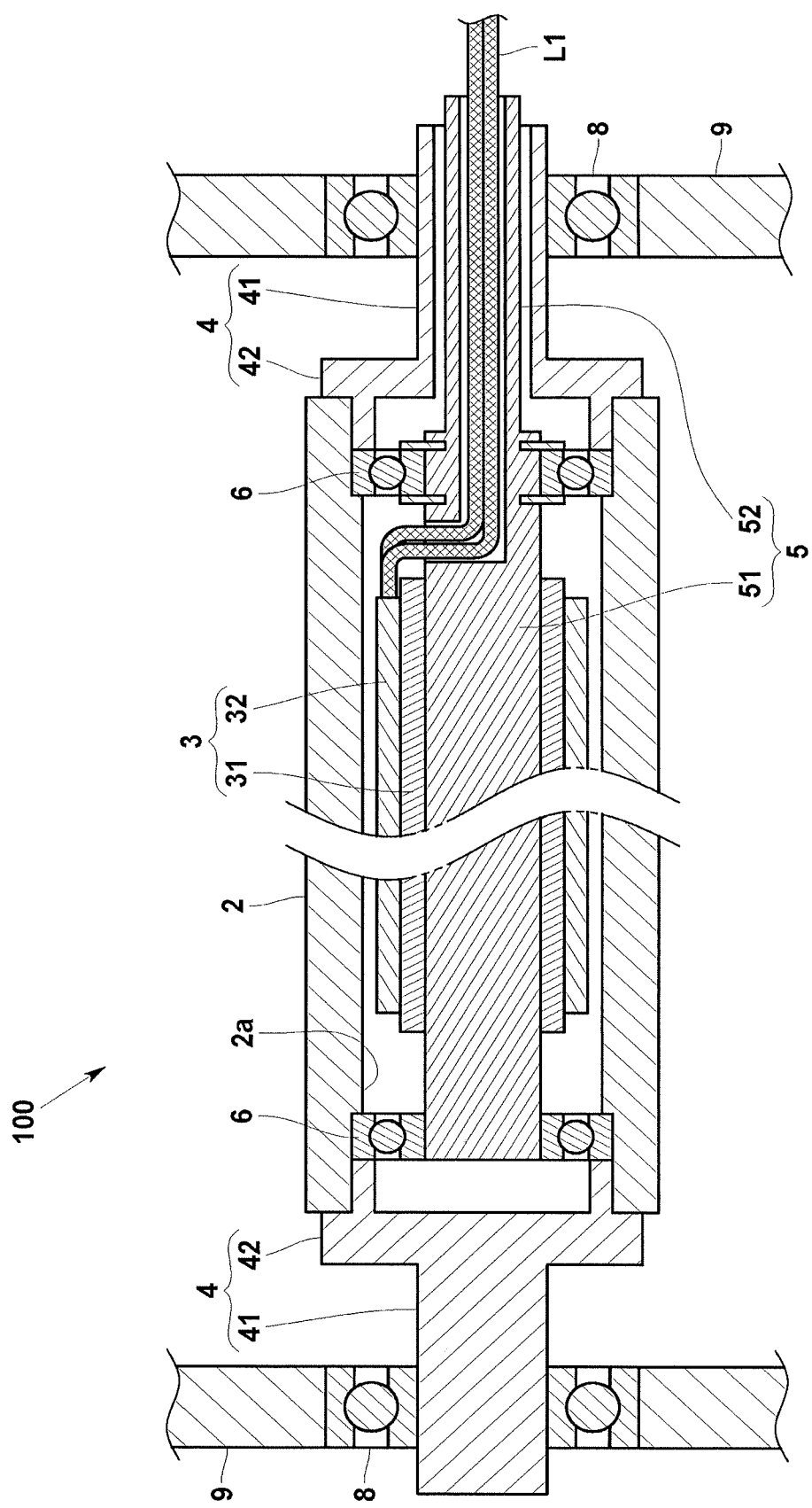
FIG. 1 is a schematic sectional view illustrating a configuration of an induction heated roll apparatus according to an embodiment of the present disclosure.
Figure 2:
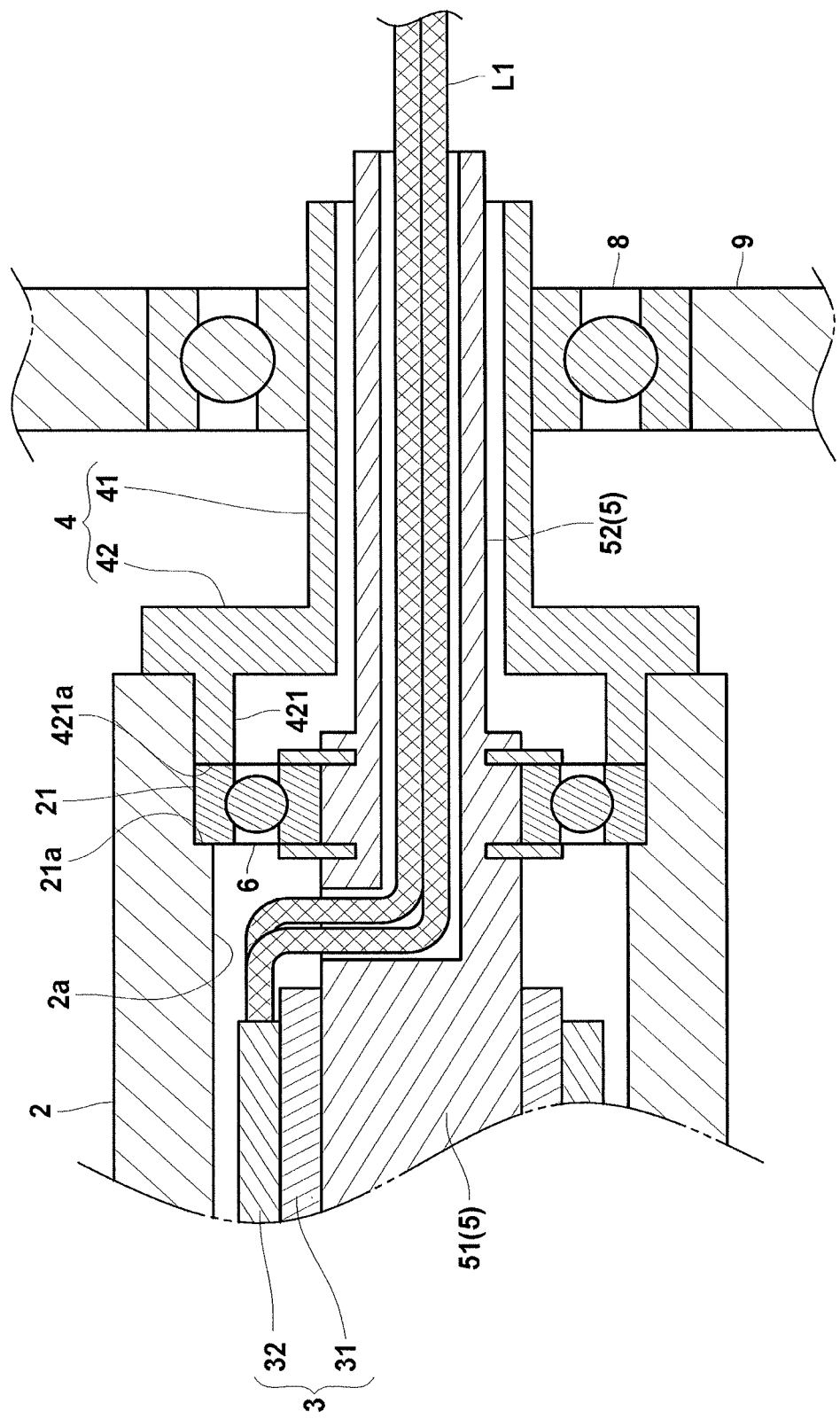
FIG. 2 is a schematic partial sectional view illustrating the configuration of the induction heated roll apparatus according to the embodiment.

As illustrated in FIGS. 1 and 2, the induction heated roll apparatus 100 according to the present embodiment includes a roller body 2 having a hollow cylindrical shape and rotatably supported and an induction heating mechanism 3 provided inside the roller body 2. The roller body 2 has a small diameter and a long length, for example, an outer diameter of 150 mm and an axial length of 2,500 mm.

A journal 4 having a hollow drive shaft 41 is provided at each of both ends of the roller body 2, and the drive shaft 41 is rotatably supported by a machine base 9 via a bearing 8 such as a rolling bearing. The journal 4 includes the drive shaft 41 and a flange 42 fixed to an axial end of the roller body 2. The roller body 2 is configured to be rotated by a driving force applied from outside by a rotation driving mechanism (not illustrated) such as a motor.

The induction heating mechanism 3 includes a cylindrical iron core 31 having a cylindrical shape, and an induction coil 32 wound around an outer peripheral surface of the cylindrical iron core 31.

A support shaft 5 that supports the induction heating mechanism 3 extend along an axial direction at both ends of the induction heating mechanism 3. Specifically, a part or all of the support shaft 5 includes a nonmagnetic material, and is an integral part penetrating the induction heating mechanism 3. Specifically, the support shaft 5 is fitted to an inner peripheral surface of the cylindrical iron core 31 and extends from both ends of the cylindrical iron core 31 along the axial direction.

The support shaft 5 is rotatably supported by an inner peripheral surface 2a at both ends of the roller body 2 via a bearing 6. As the bearing 6, a rolling bearing, a sliding bearing, a rolling bearing with an alignment function, or the like can be used. As a result, the induction heating mechanism 3 is held in a stationary state with respect to the machine base 9 (fixed side) inside the rotating roller body 2. The bearing 6 in FIG. 2 is fitted to a step 21 formed on the inner peripheral surface 2a of the roller body 2, is in contact with an outward surface 21a of the step 21, is in contact with a distal end surface 421a of a protrusion 421 formed on the flange 42 of the journal 4 to be axially positioned.

Specifically, the support shaft 5 includes a bearing fixing part 51 supported by the bearing 6 inside the roller body 2, and a lead wire extraction part 52 that extends from one end of the bearing fixing part 51, is disposed inside the drive shaft 41, and through the lead wire extraction part 52 a lead wire L1 connected to the induction coil 32 of the induction heating mechanism 3 is inserted.

The lead wire extraction part 52 is inserted into the drive shaft 41 on one end in the axial direction (right side in FIG. 1) and extends to the outside from an end of the drive shaft 41. The bearing fixing part 51 has a larger diameter than the lead wire extraction part 52. Further, the bearing fixing part 51 according to the present embodiment has a larger diameter than an inner diameter of the drive shaft 41 through which the lead wire extraction part 52 is inserted, but the present disclosure is not limited to this configuration.

A power supply circuit (not illustrated) for applying an alternating current (AC) voltage of a commercial frequency (50 Hz or 60 Hz) or the like is connected to the lead wire L1 connected to the induction coil 32.

When the AC voltage is applied to the induction coil 32 by this induction heating mechanism 3, an alternating magnetic flux is generated, and the alternating magnetic flux passes through a side peripheral wall of the roller body 2. By this passage, an induced current is generated in the roller body 2, and the roller body 2 generates Joule heat by the induced current.

Effects of Embodiment

In the induction heated roll apparatus 100 configured as described above, since the support shaft 5 supporting the induction heating mechanism 3 is supported on the inner peripheral surface 2a at both ends of the roller body 2 via the bearing 6, the diameter of the support shaft 5 (here, the lead wire extraction part 52) in the drive shaft 41 can be increased as compared with a configuration in which the support shaft 5 is supported on the inner peripheral surface of the drive shaft 41 via the bearing. Thus, when the roller body 2 has a small diameter, the lead wire L1 led out to the outside through inside of the support shaft 5 (lead wire extraction part 52) can still be thickened, and sufficient power can be supplied to the induction heating mechanism 3. As a result, this can prevent restriction to a heating temperature of the roller body 2 having a small diameter.

In the present embodiment, the support shaft 5 supporting the induction heating mechanism 3 is supported on the inner peripheral surface 2a at both ends of the roller body 2 via the bearings 6. Thus, a distance between the bearings 6 can be reduced as compared with the configuration in which the support shaft 5 is supported via the bearings inside the drive shaft 41, and deflection of the induction heating mechanism 3 and the support shaft 5 can be reduced. As a result, a risk of contact between the roller body 2 and the induction heating mechanism 3 can be reduced.

Other Embodiments

Note that the present disclosure is not limited to the above embodiment, and the following aspects may be adopted.

Figure 3:
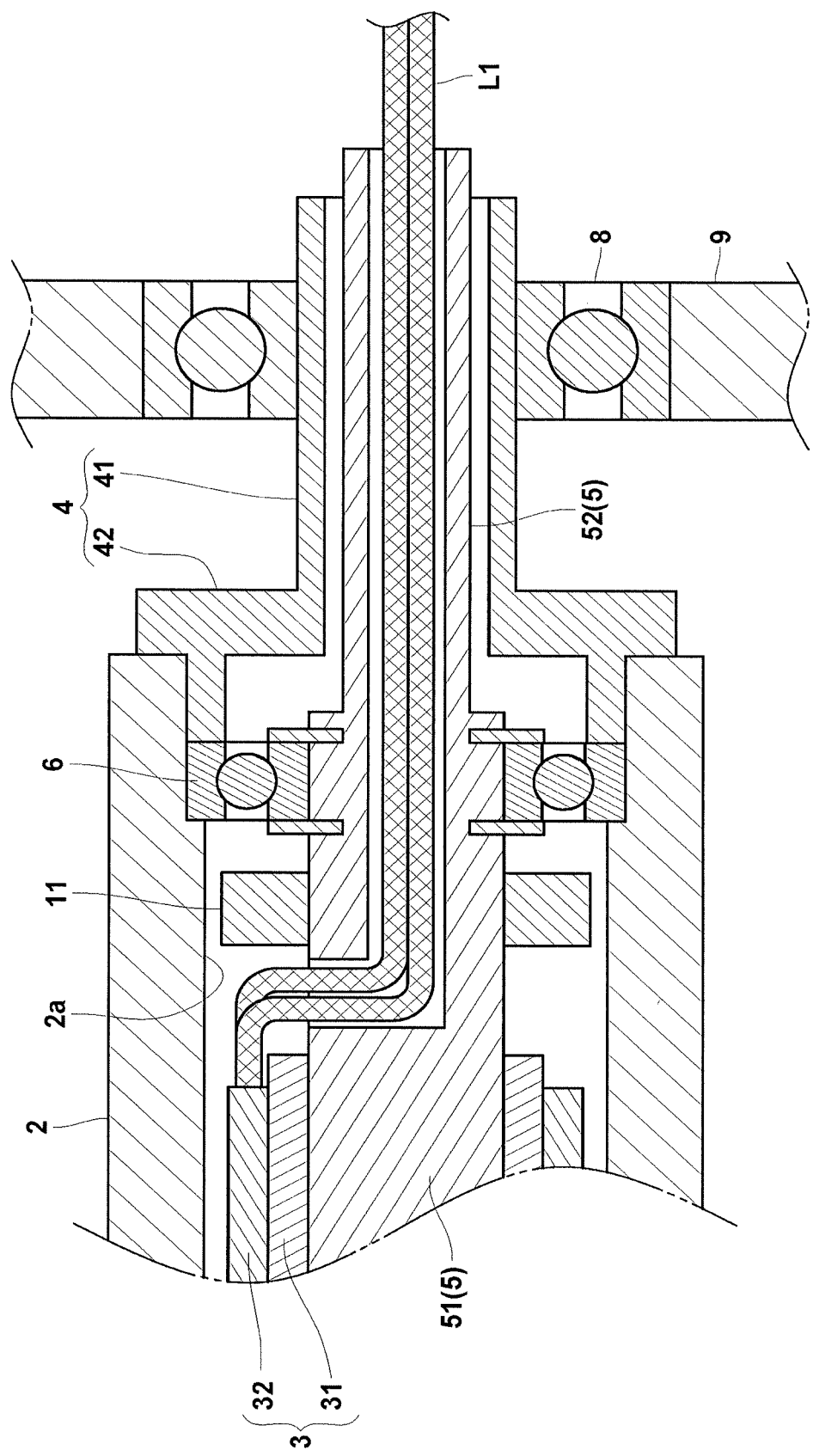
FIG. 3 is a schematic partial sectional view illustrating a configuration of an induction heated roll apparatus according to a modified embodiment.

For example, as illustrated in FIG. 3, on the support shaft 5 (bearing fixing part 51), a magnetic shield member 11 including a magnetic material may be provided between the induction heating mechanism 3 and the bearing 6. The magnetic shield member 11 prevents an alternating magnetic flux generated from the induction heating mechanism 3 from interlinking with the bearing 6 to cause the bearing 6 to generate induction heat. If the bearing 6 includes a nonmagnetic material, the magnetic shield member 11 is unnecessary.

Figure 4:
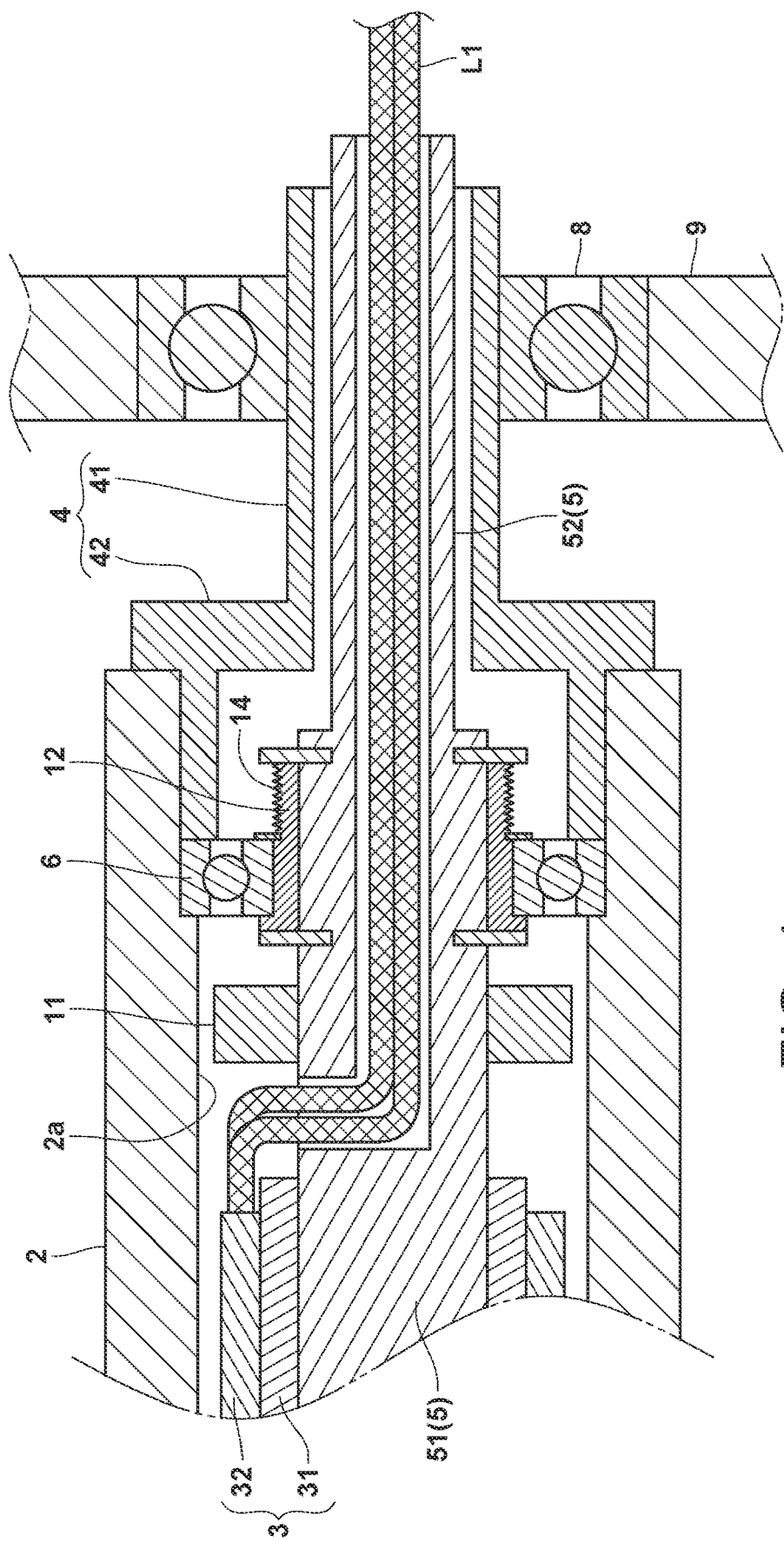
FIG. 4 is a schematic partial sectional view illustrating a configuration of an induction heated roll apparatus according to a modified embodiment.

As illustrated in FIG. 4, an inner spacer member 12 may be fitted between an outer peripheral surface of the support shaft 5 (bearing fixing part 51) and an inner peripheral surface of the bearing 6. The inner spacer member 12 has a cylindrical shape that fills a gap between the bearing fixing part 51 and the bearing 6. In the inner spacer member 12, an outer peripheral surface 14 outside the bearing 6 is processed with a screw as an attachment and detachment assist mechanism, and the inner spacer member 12 is configured to be attachable to and detachable from the support shaft 5 together with the bearing 6 by screwing a jig with the screw.

Figure 5:
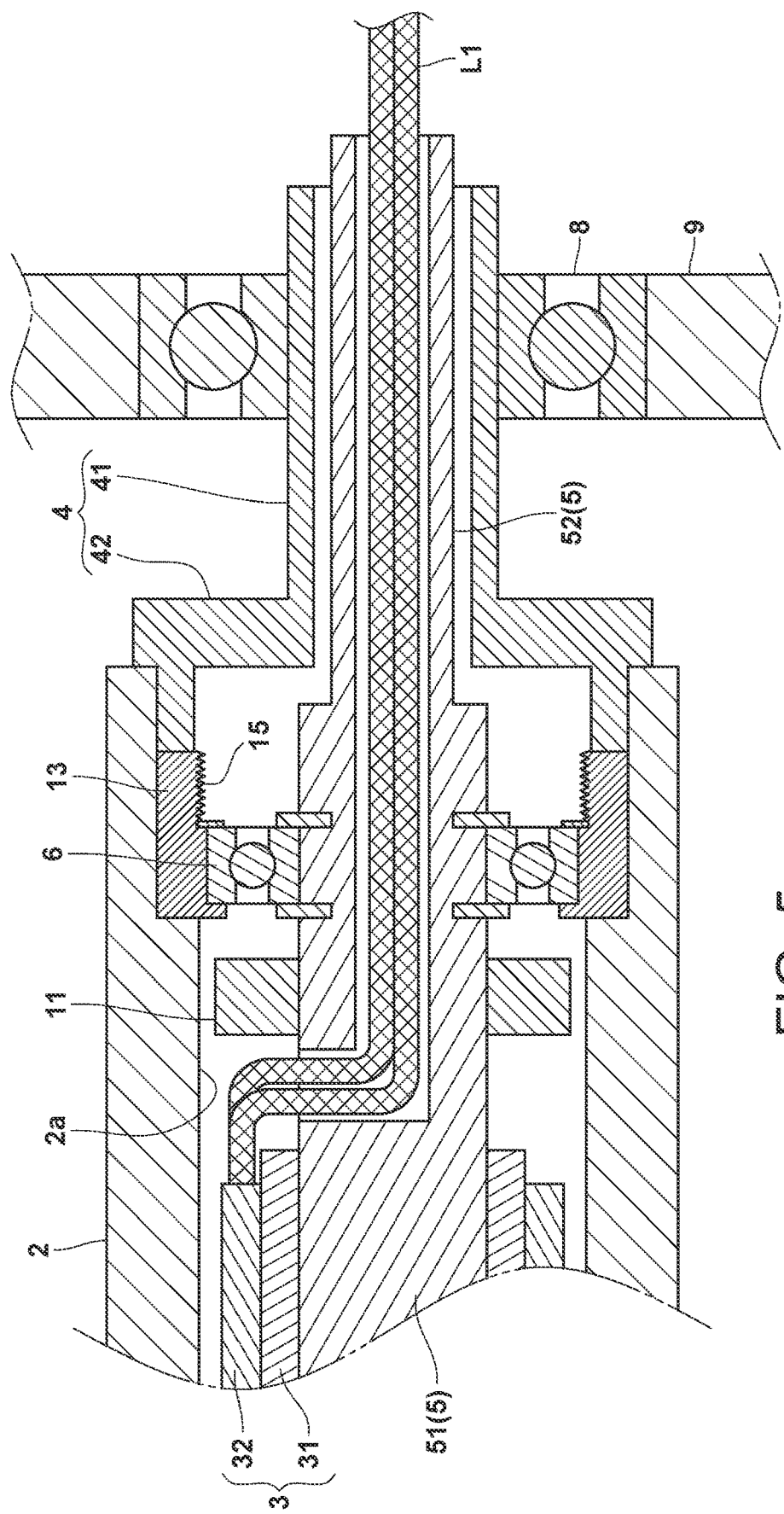
FIG. 5 is a schematic partial sectional view illustrating a configuration of an induction heated roll apparatus according to a modified embodiment.

Further, as illustrated in FIG. 5, an outer spacer member 13 may be fitted between the inner peripheral surface 2a of the roller body 2 and an outer peripheral surface of the bearing 6. The outer spacer member 13 has a cylindrical shape that fills a gap between the roller body 2 and the bearing 6. In the outer spacer member 13, an inner peripheral surface 15 outside of the bearing 6 is processed with a screw as an attachment and detachment assist mechanism, and the outer spacer member 13 is configured to be attachable to and detachable from the roller body 2 together with the bearing 6 by screwing a jig with the screw.

The present disclosure is not limited to the embodiment, and it goes without saying that various modifications can be made without departing from the gist of the present disclosure.

LIST OF REFERENCE CHARACTERS 100 induction heated roll apparatus
2 roller body
2a inner peripheral surface
3 induction heating mechanism
L1 lead wire
41 drive shaft
5 support shaft
51 bearing fixing part
52 lead wire extraction part
6 bearing
11 magnetic shield member
12 inner spacer member
13 outer spacer member

What is claimed is:

1. An induction heated roll apparatus comprising:
   a roller body having a hollow cylindrical shape;
   a drive shaft provided at each of both ends of the roller body and rotatably supported;
   an induction heating mechanism that is provided inside the roller body and allows the roller body to inductively generate heat; and
   a support shaft that extends from both ends of the induction heating mechanism and supports the induction heating mechanism, wherein
   the support shaft is rotatably supported by respective bearings fitted inside the roller body and in contact with an inner peripheral surface of the roller body at both ends of the inner peripheral surface of the roller body.

2. The induction heated roll apparatus according to claim 1, wherein the support shaft is an integral part penetrating the induction heating mechanism.

3. The induction heated roll apparatus according to claim 1, wherein
   the support shaft includes a bearing fixing part supported by the bearings inside the roller body, and a lead wire extraction part that extends from an end of the bearing fixing part is disposed inside the drive shaft, and through the lead wire extraction part a lead wire connected to the induction heating mechanism is inserted, and
   the bearing fixing part has a larger diameter than the lead wire extraction part.

4. The induction heated roll apparatus according to claim 1, wherein the support shaft includes a nonmagnetic material.

5. The induction heated roll apparatus according to claim 1, wherein a magnetic shield member including a magnetic material is provided between the induction heating mechanism and the bearings on the support shaft.

6. The induction heated roll apparatus according to claim 1, wherein respective spacer members are provided between the support shaft and the bearings or between the roller body and the bearings.

7. The induction heated roll apparatus according to claim 6, wherein the spacer members are provided with respective attachment and detachment assist mechanisms, and are configured to be attachable and detachable together with the bearings.

* * * * *